July 31, 1962    J. W. MOORE, JR    3,047,270
APPARATUS FOR MOVING A LINE THROUGH A CONDUIT
Filed Sept. 17, 1956    2 Sheets-Sheet 1
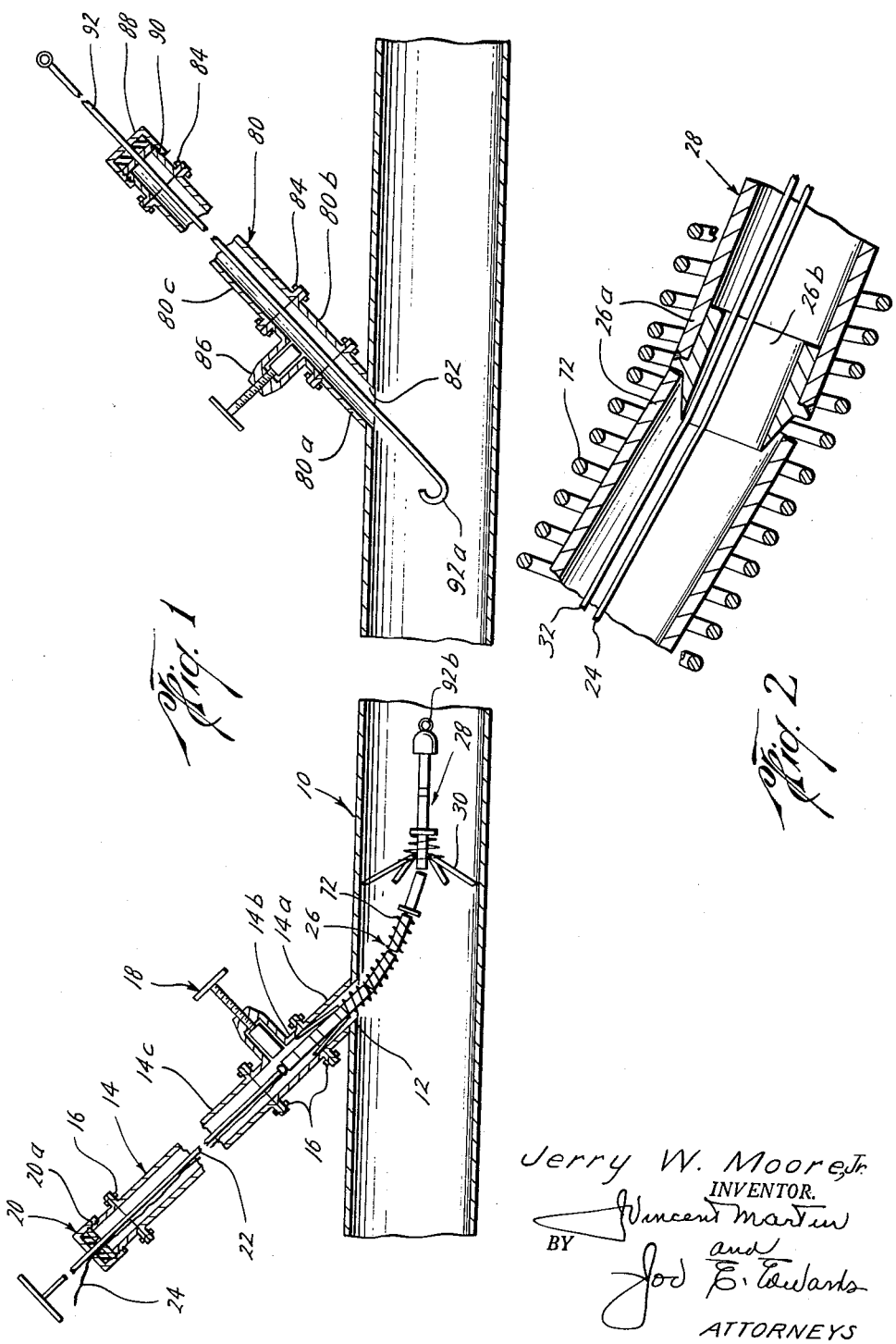
Jerry W. Moore, Jr.
INVENTOR.

July 31, 1962    J. W. MOORE, JR    3,047,270
APPARATUS FOR MOVING A LINE THROUGH A CONDUIT
Filed Sept. 17, 1956    2 Sheets-Sheet 2
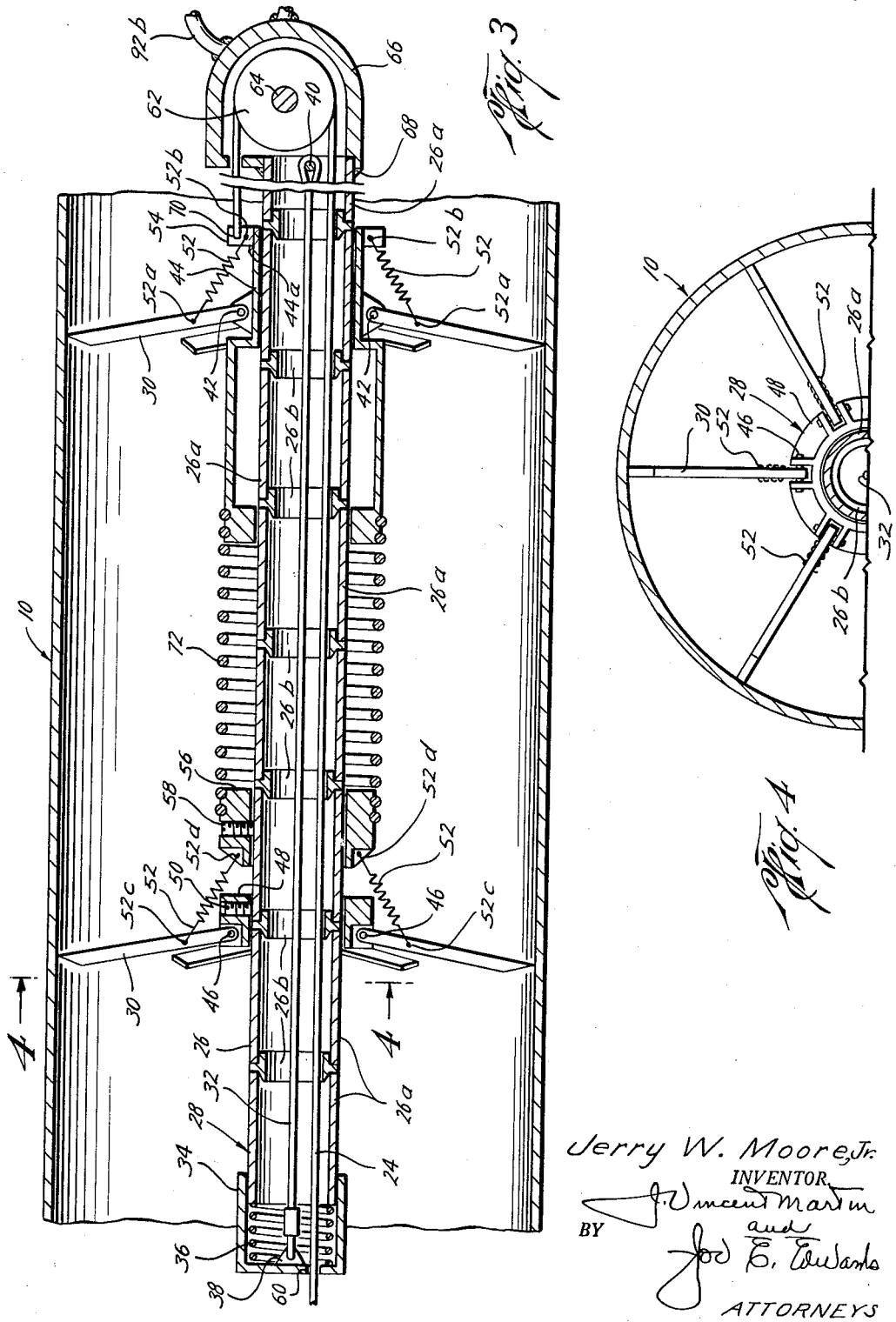
Jerry W. Moore, Jr.
INVENTOR.
J. Vincent Martin
BY
Joel E. Edwards
ATTORNEYS 3,047,270
APPARATUS FOR MOVING A LINE
THROUGH A CONDUIT
Jerry W. Moore, Jr., Shreveport, La., assignor to United Gas Corporation, Shreveport, La., a corporation of Delaware
Filed Sept. 17, 1956, Ser. No. 610,186
7 Claims. (Cl. 254—134.6)

This invention relates to a cable pulling apparatus whereby a cable may be moved through a conduit and the like and more especially to improvements in such a cable pulling device for use in a pipe line that is delivering gas under pressure.

Formerly devices, commonly known as "mooses," "creepers" and the like, capable of being advanced in successive steps or movements through pipes in response to pulling from the rear have been provided. However, there has been need for an apparatus which is capable of moving a pilot cable through a considerable length of pipe line with the line remaining in service so that pressure is maintained on the line, said device having sufficient flexibility to freely pass the curves and bends in such lines. This need is neither confined to any particular size of pipe nor necessarily to the gas industry since the same device can be used to pull a pilot cable or line through conduit for the installation of electrical wiring or for any application where it is desirable to move a pilot line through a tubular member.

Accordingly, it is an object of this invention to provide an improved apparatus including a device for moving a line through a conduit and the like which embodies relatively great flexibility and which is capable of collapsing for passage through a tube of relatively small diameter, whereby the device lends itself to introduction into and removal from the line under pressure.

Another object of this invention is to provide a device having the above advantages which is operated by exerting an axial pulling force from the rear to move a slide element forwardly with respect to the body of the device against resilient means carried by the body so that upon release of the pulling force the body of the device will move forwardly commensurate with the forward movement of the slide.

Still another object of the invention is to provide as a part of the apparatus improved means for introducing the cable pulling device into a line and removing the same from said line while fluid under pressure is flowing through said line.

The invention will be more readily understood from a reading of the following specification and by reference to the accompanying drawings forming a part thereof, wherein an example of the invention is shown, and wherein:

FIGURE 1 is a longitudinal sectional view of the cable pulling apparatus constructed in accordance with the invention and showing the same inserted in a conduit having fluid under pressure flowing therein.

FIGURE 2 is an enlarged sectional detail of one of the joints of the body of the pulling device of the apparatus.

FIGURE 3 is an enlarged longitudinal sectional view of the pulling device of the apparatus in operative position in the conduit.

FIGURE 4 is a transverse sectional view, taken along the line 4—4 in FIGURE 3.

Referring now more particularly to the drawings, FIGURE 1 shows the principle of operation of the invention. A gas line delivering gas under pressure is broadly designated at 10. There is a conventional tap 12 made on the line at a 45° angle. A launching tube 14 is suitably secured to the pipe 10, as by welding, so as to communicate with the pipe 10 through the tap 12. The launching tube 14 is constructed of three relatively small sections of pipe 14a, 14b and 14c, respectively. These sections are secured together by suitable fluid tight joints as by bolts 16. A gate valve 18 is interposed in the section 14b so that the portion of the launching tube 14 remote from the pipe 10 may be isolated therefrom by closing the valve 18. A lubricator in the form of a packing gland 20 is threadably secured as at 20a at the free end of the launching tube 14. The packing gland 20 permits the passage of a suitable launching rod 22 and a stepping cable 24 while maintaining the launching tube 14 fluid tight.

The "moose" or "creeper" 28 is placed within the launching tube 14 and the packing gland 20 is replaced. Then the gate valve 18 is opened and the "moose" moved into the pipe line with the launching rod 22. This operation is made possible by the jointed body 26 of the "moose" 28 which will be described in greater detail below. The jointed body 26 allows the instrument to be moved around reasonable bends and the engaging probes 30 are hinged or pivoted, as will be further described below, to allow them to fold up for passage through the relatively small launching tube 14.

Referring particularly to FIGURES 1 and 3, the supporting body 26 of the device 28 is made up of short segments 26a, which are aligned in end to end relation, with a ball joint 26b between each segment. The segments 26a are normally held straight and together by a cable 32 that is positioned axially of the body. A cylindrical housing 34 is slidably positioned on the rear segment 26a and carries a coil spring 36. The cable 32 is secured as at 38 to the housing 34 on one end thereof and the front segment 26a as at 40 on the other end. By this arrangement, the body of the device may be deflected to enter the pipe line 10 and after entrance will again resume its straight rigid position by virtue of the spring 36 exerting an axial force against the segments 26a.

FIGURE 3 shows the device 28 in the pipe line 10 in such straight position. There are a plurality of circumferentially spaced probes or arms 30 located toward the front of the body 26. These arms 30 are pivotally mounted as at 42 on a slide 44 which is carried by the body 26. There are also a plurality of similar arms 30 pivotally mounted as at 46 at the rear of the device 28 on the collar 48 which is fixed to the body 26 by the set screws 50. All the arms 30 are held in contact with the pipe wall 10 by springs 52 at an optimum angle to give the best contact between the arms 30 and the pipe wall 10. The springs 52 are secured to the front arms 30 as at 52a on one end thereof and to the abutment 54, which is welded to the slide 44 at 44a, as at 52b on the other end. The springs 52 are secured to the rear arms 30 as at 52c on one end thereof and to the abutment 56 at 52 on the other end; the abutment is secured to the body 26 as by the set screws 58.

The stepping cable 24 is very light and durable and runs from the device through an opening 60 in the housing 34. The cable 24 is passed axially through the body 26 of the device 28 around a pulley 62 rotatable, at the front of the device, on a stub shaft 64 which is fixed adjacent its ends in the housing 66 which is suitably secured by welding at 68 to the front segment 26a. The cable 24 is fixed to the abutment 54 carried by the slide 44 as at 70. The slide 44 is normally urged rearwardly by the coil spring 72 which surrounds the body 26 and is suitably secured to the slide 44 on one end thereof and to the abutment 56 on the other end.

By exerting a pulling force on the cable 24, the slide 44 is moved forwardly energizing the spring 72. This is possible since the arms 30 located at the rear of the body 26 are held in contact with the pipe wall by the springs 52 carried by the abutment 48 and prevent the device 28 from moving backward in the pipe due to the force applied to the cable 24. At the same time due to the angle of attack the arms 30 on the slide 44 will slide along the pipe wall 10. After the slide 44 has been moved to its ultimate forward position as shown in FIGURE 3, and the spring 72 is energized, the forward motion of the slide is stopped and the springs 52 carried by the slide 44 will force the arms 30 in contact with the pipe wall 10. The energy of the spring 72 will move the body 26 of the device 28 forward the length of the extended spring 72 and the cycle may be repeated to advance the device 28 with respect to the pipe 10 in successive movements.

Referring again to FIGURE 1, the means for retrieving the device 28 from the line are shown. It will be noted that the means for retrieving the device may be located at any desired point in the line 10 and are similar to the launching tube 14 and related parts except being disposed at an acute rather than obtuse angle to the path of travel of the device 28. The receiving means consist essentially of a receiving tube 80 formed of pipe sections 80a, 80b and 80c which communicate with the pipe 10 through the tapped hole 82. The section 80a is secured to the pipe 10 as by welding and the sections 80a, 80b and 80c are secured together as by bolts 84 to form fluid tight joints. The receiving tube 80 is also provided with a gate valve 86 and a packing gland 88 which is threadably secured to the free end of the tube 80 as at 90. A receiving rod 92 passes through the packing gland 88 and is provided with a hook 92a to engage the loop 92b carried by the housing 66 to pull the device 28 into the receiving tube 80.

In operation, therefore, the "moose" or "creeper" 28 is introduced into the fluid tight launching tube 14 and the gate valve 18 is opened so that the launching rod 22 may push the "moose" 28 into the pipe 10 which is carrying gas under pressure. This is made possible by the ball joints 26b, the collapsible arms 30, the spring 36 and the axial cable 32 permitting the body 26 to have sufficient resilience for the device 28 to flex so as to negotiate a turn, the launching tube being disposed at an obtuse angle with the direction of travel. By exerting a pulling force on the stepping cable 24, the slide 44 is advanced, while the body 26 is maintained in fixed relation to the pipe by the rear arms 30. Upon the relaxation of the pulling force, the forward arms 30 maintain the position of the slide with respect to the pipe 10 and permit the body 26 to advance by virtue of the action of the coil spring 72. This intermittent exerting of pulling force allows the device 28 to advance in successive movements. At a desired point in the pipe 10, the device 28 carrying the line of cable 24 may be retrieved from the pipe by introducing the device 28 into the receiving tube 80 as described above while maintaining the line 10 in operation.

The invention is not limited to the preferred embodiment herein disclosed. Various changes within the scope of the following claims will occur to those skilled in the art.

What is claimed is:

1. Apparatus for moving a line through a pipe and the like having means advancing said apparatus in successive movements with respect to the pipe by exerting an intermittent axial pulling force on said apparatus from the rear including, an elongated body having a plurality of aligned sections, a flexible joint between adjacent sections, and resilient means in tension exerting axial pressure against the sections so as to normally maintain such sections in longitudinal alignment.

2. Apparatus for moving a line through a pipe and the like having means advancing said apparatus in successive movements with respect to the pipe by exerting an intermittent axial pulling force on said apparatus from the rear including, an elongated body having a plurality of aligned sections, a flexible joint between adjacent sections, resilient means in tension exerting axial pressure against the sections so as to normally maintain such sections in longitudinal alignment, and collapsible means carried by the body contacting the pipe maintaining the body in fixed position against the pulling force exerted on the apparatus from the rear.

3. Apparatus for moving a line through a pipe and the like having means advancing said apparatus in successive movements with respect to the pipe by exerting an intermittent axial pulling force on said apparatus from the rear including, an elongated body having a plurality of aligned sections, a flexible joint between adjacent sections, resilient means in tension exerting axial pressure against the sections so as to normally maintain such sections in longitudinal alignment, and a plurality of spring biased arms disposed at an obtuse angle with the direction of travel of the apparatus carried by the body contacting the pipe maintaining the body in fixed position against the pulling force exerted on the apparatus from the rear.

4. Apparatus for moving a line through a pipe and the like having means advancing said apparatus in successive movements with respect to the pipe by exerting an intermittent axial pulling force on said apparatus from the rear including, an elongated body having a plurality of aligned sections, a flexible joint between adjacent sections, flexible means disposed axially of the body serving to maintain said sections in closely adjacent relation to each other, and resilient means exerting axial pressure against the sections so as to normally maintain such sections in longitudinal alignment.

5. Apparatus for moving a line through a pipe and the like having means advancing said apparatus in successive movements with respect to the pipe by exerting an intermittent axial pulling force on said apparatus from the rear including, an elongated body having a plurality of aligned sections, a flexible joint between adjacent sections, a housing slidably carried by one end of the body, flexible means joining the housing and the other end of the body, and resilient means carried by the housing exerting axial pressure against the sections so as to normally maintain such sections in longitudinal alignment.

6. Apparatus for moving a line through a pipe including, an elongated body having a plurality of aligned sections, a flexible joint between adjacent sections, resilient means exerting axial pressure against the sections so as to normally maintain such sections in longitudinal alignment, a slide carried on the body, resilient means normally urging said slide rearwardly on said body, stepping cable means pulling said slide forwardly against the force normally exerted by said resilient means, collapsible means carried by the body contacting the pipe maintaining the body in fixed position against the means pulling said slide forwardly, and collapsible means carried by the slide contacting the pipe maintaining said slide in fixed position when the slide is in forward position, whereby said body will advance in said pipe when said means pulling said slide forwardly are relaxed due to the force exerted by said resilient means.

7. Apparatus for moving a line through a pipe including, an elongated body having a plurality of aligned sections, a flexible joint between adjacent sections, resilient means exerting axial pressure against the sections so as to normally maintain such sections in longitudinal alignment, a slide carried on the body, resilient means normally urging said slide rearwardly on said body, stepping cable means pulling said slide forwardly against the force normally exerted by said resilient means, a plurality of circumferentially spaced, spring biased, arms disposed at an obtuse angle with the direction of travel of the apparatus carried by the body contacting the pipe maintaining the body in fixed position against the means pulling said slide forwardly, and a plurality of circumferentially spaced, spring biased arms disposed at an obtuse angle with the direction of travel of the apparatus carried by the slide contacting the pipe maintaining said slide in fixed position when the slide is in forward position, whereby said body will advance in said pipe when said means pulling said slide forwardly are relaxed due to the force exerted by said resilient means.

References Cited in the file of this patent

UNITED STATES PATENTS

| | | |
|---|---|---|
| 273,295 | Lytle | Mar. 6, 1883 |
| 438,356 | McEnany | Oct. 14, 1890 |
| 673,478 | Rodgers | May 7, 1901 |
| 809,880 | Woolldridge et al. | Jan. 9, 1906 |
| 914,824 | Greenan | Mar. 9, 1909 |
| 1,250,064 | Whims | Dec. 11, 1917 |
| 2,322,508 | Crane | June 22, 1943 |
| 2,609,556 | Carver | Sept. 9, 1952 |
| 2,673,710 | Olson | Mar. 30, 1954 |
| 2,727,722 | Conboy | Dec. 20, 1955 |
| 2,767,415 | Morris et al. | Oct. 23, 1956 |